(12) United States Patent
Wang

(10) Patent No.: US 6,428,900 B1
(45) Date of Patent: Aug. 6, 2002

(54) SULFONATED COPOLYESTER BASED WATER-DISPERSIBLE HOT MELT ADHESIVE

(75) Inventor: Baoyu Wang, Waukesha, WI (US)

(73) Assignee: Ato Findley, Inc., Wauwatosa, WI (US)

( * ) Notice: Subject to any disclaimer, the term of this patent is extended or adjusted under 35 U.S.C. 154(b) by 0 days.

(21) Appl. No.: 09/522,029

(22) Filed: Mar. 9, 2000

(51) Int. Cl.$^7$ ................................................ C09J 167/02
(52) U.S. Cl. ...................... 428/481; 525/166; 525/167; 525/408; 525/437; 525/448; 524/271; 524/292; 524/294; 524/317; 524/318; 524/339; 524/340; 524/375; 524/378; 524/425; 524/437; 524/441; 524/444; 524/445; 524/449; 524/539
(58) Field of Search ................................ 525/408, 437, 525/166; 524/539, 271, 317, 318, 292, 294, 339, 340, 375, 378, 425, 437, 441, 444, 445, 449; 428/481

(56) References Cited

U.S. PATENT DOCUMENTS

| | | | |
|---|---|---|---|
| 4,052,368 A | 10/1977 | Larson | 260/75 |
| 4,172,824 A | 10/1979 | Harrington, Jr. et al. | 260/31.2 |
| 4,325,851 A | 4/1982 | Colon et al. | 524/83 |
| 4,331,576 A | 5/1982 | Colon et al. | 524/271 |
| 4,540,749 A | 9/1985 | Meyer, Jr. et al. | 525/437 |
| 4,623,688 A | 11/1986 | Flanagan | 524/377 |
| 4,699,941 A | 10/1987 | Salerno | 524/308 |
| 4,871,803 A | 10/1989 | Zimmel et al. | 525/89 |
| 5,071,914 A | 12/1991 | Zimmel et al. | 525/113 |
| 5,098,962 A | 3/1992 | Bozich | 525/437 |
| 5,143,961 A | 9/1992 | Scholl et al. | 524/317 |
| 5,459,184 A | 10/1995 | Bunnelle et al. | 524/221 |
| 5,543,488 A | 8/1996 | Miller et al. | 528/277 |
| 5,552,495 A | 9/1996 | Miller et al. | 525/437 |
| 5,552,511 A | 9/1996 | Miller et al. | 528/277 |
| 5,571,876 A | 11/1996 | Miller et al. | 525/437 |
| 5,605,764 A | 2/1997 | Miller et al. | 428/480 |
| 5,750,605 A | 5/1998 | Blumenthal et al. | 524/230 |
| 6,007,910 A | 12/1999 | Miller et al. | 428/355 |
| 6,162,890 A | * 12/2000 | George | 528/295 |

OTHER PUBLICATIONS

Billmeyer, F.W. *Textbook of Polymer Science,* p. 439 Wiley-Interscience, NY (1971).*

* cited by examiner

*Primary Examiner*—Patricia A. Short
(74) *Attorney, Agent, or Firm*—Andrus, Sceales, Starke & Sawall, LLP

(57) ABSTRACT

A water-sensitive hot melt adhesive composition based on sulfonated branched copolyester polymers for use with articles such as paper products, disposable nonwoven products, tapes, labels and packaging materials. The adhesive composition includes about 10% to about 90%, by weight, of a sulfonated polyester copolymer or a blend of one or more sulfonated polyester polymers; about 0% to about 80%, by weight, of a tackifying resin; about 0% to about 40%, by weight, of a compatible plasticizer; about 5% to about 50% by weight of a polyethylene glycol having a molecular weight greater than 2000 and a melting point greater than 50° C; and about 0% to about 3% by weight of one or more antioxidant. The adhesive maintains the article in an assembled condition by providing adequate adhesive bond strength during normal use, but dissolves in the presence of water thereby permitting the article to be recycled or otherwise disposed of in an environmentally friendly manner.

19 Claims, No Drawings

SULFONATED COPOLYESTER BASED WATER-DISPERSIBLE HOT MELT ADHESIVE

BACKGROUND OF THE INVENTION

The present invention relates to hot melt adhesives, and more particularly to a water-sensitive hot melt adhesive composition based on a sulfonated polyester copolymer.

The term water-sensitive hot melt adhesive as used herein refers to a category of adhesives including water-soluble, water-dispersible, water releasable and repulpable hot melt adhesives. The adhesive of the present invention particularly relates to water-soluble and water-dispersible products which can be disintegrated by the action of water, thereby permitting paper products, disposable nonwoven articles, tapes and labels, and other disposable products to be more effectively recycled. The adhesives of the present invention can be pressure sensitive or non-pressure sensitive. The present invention is also directed to water-sensitive adhesives that are particularly useful in the assembly of disposable nonwoven articles.

Hot melt adhesives typically exist as a solid mass at ambient temperature and can be converted to flowable liquid state by the application of heat. These adhesives are particularly useful in manufacturing of a variety of disposable goods where bonding of various substrates is often necessary. Specific applications have included disposable diapers, sanitary napkins, pantyshields, surgical drapes, hospital pads and adult incontinence briefs; collectively known as disposable nonwoven products. Other diversified applications have involved paper products, packaging materials, tapes and labels. In these applications, the hot melt adhesive is heated to the molten state and then applied to a substrate. A second substrate is immediately laminated to the first and the adhesive solidifies on cooling to form a strong bond. The major advantage of hot melt adhesives is the lack of a liquid carrier, as would be the case for water-based or solvent based adhesives, thereby eliminating the costly drying step during application. Suitable hot melt adhesives must possess the appropriate bond strength to adhere the substrates involved, and must also possess adequate flexibility, staining or bleedthrough resistance, suitable viscosity and open time to function on commercial equipment, acceptable stability under storage conditions, and acceptable thermal stability under normal application temperature.

Many different polymers have been used in hot melt adhesives employed in the construction of disposable goods. In this regard, typical hot melt adhesives have employed polymers which have included styrene-isoprene-styrene (SIS); styrene-butadiene-styrene (SBS); styrene-ethylene-butylene-styrene (SEBS); ethylene-vinyl acetate (EVA); and amorphous poly-alpha-olefin (APAO). While these polymers, when properly blended, provide acceptable adhesion between most substrates employed in typical disposable goods construction such as diapers or packaging materials, they have had several shortcomings which have detracted from their usefulness.

One of the most noteworthy shortcomings of the prior hot melt adhesives concerns their solubility in water. Typical hot melt adhesives are insoluble in water and thus difficult to recycle. It is very desirable to recycle paper products and other disposable goods to conserve raw material resources and landfill space. It is thus a general practice in the paper industry to collect and repulp waste paper to recover the cellulose fiber and to regenerate other useful paper products such as toilet paper or paperboard. Since no readily convenient method is currently available for recycling, or otherwise separating the components of disposable goods such as disposable diapers into component parts whereby the component parts may be recycled or alternatively disposed of in an environmentally friendly manner to reduce any adverse impact these objects may have on the environment, concerns have frequently been raised regarding the environmental consequence of such products once they become unserviceable and disposed of in landfills or the like. The insolubility of the conventional hot melt adhesives further exacerbates such recycling problems. Thus, it would be desirable to utilize water-sensitive hot melt adhesives to help solve this disposal and recycling problem since these adhesives will lose their bonding ability by soaking in water, thereby permitting the bonded object to disassemble into its component parts for easy separation and recovery. However, it must be understood that any such water-sensitive hot melt adhesive must perform its intended function during storage and service where contact with moisture is, in many cases, unavoidable. As a result, the water sensitivity of hot melt adhesives must be balanced against the need to provide adequate bond strength to maintain the structural integrity of the products until disposal.

The most common water-sensitive or water-soluble hot melt adhesives are based on polymers containing vinyl pyrrolidone or other vinyl heterocyclic monomers as taught by Colon et al, in U.S. Pat. Nos. 4,331,576 and 4,325,851. These adhesives are made from vinyl pyrrolidone polymers, vinyl pyrrolidone/vinyl acetate copolymers, and other vinyl pyrrolidone based polymers. Another class of water-sensitive hot melt adhesives include the polyester based adhesives comprising a single or a blend of copolyesters in combination with a plasticizer, which are disclosed in Morrison, U.S. Pat. No. 4,052,368, and in Harrington, Jr., et al, U.S. Pat. No. 4,172,824, and in Miller, et al, US Patent Nos. 5,543,488, 5,552,511 and 5,605,764.

The polyvinyl pyrrolidone and polyester based adhesives are typically applied as a liquid to a substrate from a reservoir or glue pot heated to temperatures between 150° C.–200° C. Water-sensitive adhesives based on a polyvinyl pyrrolidone or a polyvinylpyrrolidone/vinyl acetate exhibit poor thermal stability. Such adhesive formulations can rapidly degrade at the elevated pot temperatures which are employed during their application. Copolyester based adhesives, due to the potential chemical reactivity of copolyester with many other ingredients that are often used to make a useful hot melt adhesive, suffer from limitations in formulation latitude and therefore from the lack of balance between water sensitivity and bond strength, thereby further limiting their usefulness.

Other water-sensitive hot melt adhesives are based on polyvinylmethylether. They contain either water-soluble or insoluble plasticizers and a large amount of water-insoluble tackifier. Polyvinylmethylether has limited solubility in water which limits its utility in many applications. Also, the polymer has poor thermal stability, has a dark color raising aesthetic concerns, and has a strong objectionable odor problem.

Water-soluble hot melt adhesives based on substituted polyalkyleneimine (polyoxazoline) homopolymers are disclosed in Scholl et al U.S. Pat. No. 5,143,961 and Bunnelle et al U.S. Pat. No. 5,459,184. Such adhesives, however, are brittle and exhibit limited cohesive strength. In addition, such adhesives usually have high viscosity which often limit their applications in disposable goods.

Finally, water-soluble hot melt adhesive based on sulfonated copolyester are disclosed in Blumenthal et al U.S.

Pat. No. 5,750,605. It is stated therein that the heat resistance and strength of hot melt adhesives based on sulfonated polyesters may be significantly improved by the incorporation of specific crystalline waxes, or alternately, by the incorporation of certain hydrophobic crystalline thermoplastic polymers. Most of such crystalline materials, however, are not compatible with sulfonated copolyesters and will separate into two different phases. Another drawback with the incorporation of insoluble crystalline materials is the reduction in solubility or dispersibility in water and the rate of dissolution and dispersion. The adhesives taught in the U.S. Pat. No. 5,750,605 patent require rigorous blending at high speed and high shear conditions to dissolve or disperse. These high speed and high shear conditions are neither practical nor obtainable for most applications, such as, for example, in toilet flushable feminine pad construction. In this case, the adhesive bond is required to disintegrate quickly before or during the toilet flush which produces a very low level of agitation and shear. In applications where good dispersibility and a fast rate of dissolution are essential, the use of crystalline materials as taught in the '605 patent is undesirable. The most serious shortcoming of these prior art adhesives lies in their poor adhesion to the low surface energy substrates such as polyethylene and polypropylene. This lack of adhesion to the low surface energy substrates essentially rules out the prior art adhesives for disposable nonwoven production applications where bonding of polyethylene film to polypropylene nonwoven fabric is necessary for the product construction.

Accordingly, a need exists for a hot melt adhesive composition that is substantially heat stable and water-sensitive, that can form strong bonds on low surface energy substrates, that can be dissolved or dispersed quickly in water at low agitation and low shear conditions, and that can be induced to debond quickly upon exposure to water.

SUMMARY OF THE INVENTION

It is an object of the present invention to provide an improved water-sensitive hot melt adhesive composition which provides good adhesion to low surface energy substrates and is uniquely well suited for the manufacturing of disposable goods, especially disposable nonwoven articles.

Another object of the present invention is to provide a water-sensitive hot melt adhesive composition (can be pressure sensitive or non-pressure sensitive) which when employed in connection with manufacturing of disposal articles has an excellent dry bond strength, but which can be induced to delaminate when exposed to water, thereby permitting the component elements of the disposable article to be recycled or otherwise disposed of in an environmentally friendly manner. Another object of the present invention is to provide a water-sensitive hot melt adhesive composition which, when incorporated into a disposable article such as a diaper, maintains the article in an assembled state during its normal use notwithstanding exposure to aqueous media such as urine.

Further objects and advantages of the present invention are to provide a water-sensitive hot melt adhesive composition which possesses an excellent balanced adhesion, high temperature stability and acceptable cohesive strength at a relatively low viscosity for the purpose described, and which is durable, easy to apply by utilizing conventional manufacturing techniques, and which further does not have the shortcomings attributable to the prior art adhesives utilized heretofore.

Accordingly, a hot melt adhesive may be formulated having the following composition:

(a) about 10% to about 90% by weight of one or more sulfonated copolyester polymer(s);

(b) about 5% to about 50% by weight of polyethylene glycol having a molecular weight greater than 2000 and a melting point greater than 50° C.;

(c) about 0% to about 40% by weight of one or more compatible plasticizer(s);

(d) about 0% to about 80% by weight of one or more compatible tackifying resin(s); and (e) about 0% to about 3% by weight of one or more stabilizer(s);

the components of the composition adding up to 100% by weight. The adhesive composition may also contain other components which can modify the adhesive properties of, or add adhesive properties to, the above basic adhesive composition.

In essence, the present invention provides a new approach to water-sensitive hot melt adhesives through incorporating a relatively high molecular weight solid water soluble polyethylene glycol (PEG) in the composition. The present invention has numerous advantages. For example, the solid PEG used in this adhesive composition substantially eliminates any cold flow. The term cold flow refers to the physical phenomenon that the bulk of certain amorphous substances, particularly the natural and synthetic rubbers and the like, changes its shape under gravity at the ambient temperature. Cold flow is detrimental in the packaging of product and can cause blocking in disposable nonwoven applications, and therefore, must be avoided. Also, in contrast to the crystalline materials used in the adhesives taught in the U.S. Pat. No. 5,750,605 patent, the use of soluble solid PEG enhances the solubility of the adhesive in water; i.e., the present adhesive using solid PEG has increased solubility in water and can be dissolved at a fast rate under gentle conditions as compared to the same formulation utilizing the crystalline materials taught in the '605 patent. The most important and yet not easily perceivable and recognizable benefit of the present adhesive composition is its ability to bond tenaciously to low surface energy substrates such as polyethylene and polypropylene, to which the prior art adhesive taught in the '605 patent fails to bond. In addition, it has been found that the solid PEG is more compatible with the other components of the adhesive blend than the crystalline materials taught in the previous art.

DETAILED DESCRIPTION OF THE INVENTION

The preferred hot melt adhesive composition of the present invention, as noted above includes about 10% to about 90%, by weight, of sulfonated copolyester polymer or a blend of more than one sulfonated copolyester polymers; about 0% to about 80%, by weight, of one or more compatible tackifying resins; about 0% to about 40%, by weight, of a suitable plasticizer; about 0% to about 3%, by weight, of a stabilizer and about 5% to about 50%, by weight, of polyethylene glycol having a molecular weight greater than 2000 and a melting point greater than 50° C.; the components of the composition adding up to 100% by weight; and wherein the hot melt adhesive composition is hydrophilic, i.e. readily water-soluble, water-sensitive or water-activated.

The major component of the adhesive of the invention, present in an amount of 10 to 90% by weight of the adhesive comprises a sulfonated copolyester condensation polymer comprising the reaction product of:

(a) at least one difunctional dicarboxylic acid or corresponding methyl ester which is not a sulphomonomer;

(b) 2 to 25 mole percent of at least one sulphomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

(c) at least one difunctional reactant selected from a glycol or a mixture of a glycol and diamine having two —NRH groups, the glycol containing two —C(R$^1$)$_2$-OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbons atoms;

(d) 0 to 40 mole percent of a difunctional reactant selected from hydroxycarboxylic acids having one —C(R)$_2$—OH group, aminocarboxylic acids having one —NRH group, amino-alcohols having one —(R)$_2$—OH group and one —NRH group, or mixtures of said difunctional reactants wherein R in the reactant is hydrogen or an alkyl group of 1 to 6 carbon atoms; and (e) 0 to 40 mole percent of a multifuinctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of (equivalents) EQ (base) divided by (equivalents) EQ (acid) is between 0.5 and 2.

The difunctional acid or ester reactant of component (a) of the composition of the present invention is preferably substantially aliphatic in nature and may be an acid selected from the group consisting of oxalic; malonic; dimethylmalonic; succinic; glutaric; adipic; trimethyladipic; pimelic; pivalic; ftimaric; maleic; dodecanoic; 2,2-dimethylglutaric; azelaic; sebacic; 1,3-cyclopentane-dicarboxylic; 1,2-cyclohexanedicarboxylic; 1,3-cyclohexane dicarboxylic; 1,4-cyclohexanedicarboxylic; phthalic; terephthalic; isophthalic; 2,5-norbomane-dicarboxylic; 1,3-naphthalic; diphenic; 4,4'-oxydibenzoic; diglycolic; thiodiproplonic; 4,4'-sulfonyldibenzoic; and 2,5-naphthalenedicarboxylic acids and esters thereof and mixtures thereof. The difunctional dicarboxylic acid or ester reactant of component (a) is preferably selected from the group of acids consisting of isophthalic acid, terephthalic acid, phthalic anhydride (acid), adipic acid, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, and glutaric acid and esters thereof and mixtures thereof. The more preferred difunctional dicarboxylic acid reactants of (a) are selected from the group consisting of isophthalic acid, adipic acid, 1,4-cyclohexanedicarboxylic acid, 1,3-cyclohexanedicarboxylic acid and mixtures thereof with 1,4-cyclohexanedicarboxylic acid being most preferred.

The sulphomonomer reactant of component (b) is preferably selected from the group consisting of difunctional monomers containing a —SO$_3$M group attached to a nucleus selected from the group consisting of benzene, naphthalene, anthracene, diphenyl, oxydiphenyl, sulfonyldiphenyl, and methylenediphenyl, wherein M is Na+, Li+, Mg++, Ca++, Fe++, and Fe+++. The more preferred sulfomonomer reactant of component (b) is selected from the group consisting of diols and diol adducts of multifinctional reactant containing at least three hydroxyl groups and a monocarboxylic acid sulfomonomer containing at least one metallic sulfonate group or nitrogen-containing non-metallic sulfonate group attached to an aromatic or cycloaliphatic nucleus. Alternatively, a more preferred group of sulfomonomers include 5-sodiosulfoisophthalic acid, dimethyl 5-sodiosulfoisophthalate, 5-lithiosulfoispthalic acid, and bis(2-hydroxyethyl)-5-sodiosulfoisophthalate; with the 5-sodiosulfoisophthalic acid or dimethyl 5-sodiosulfoisophthalate being most preferred.

The difunctional reactant of component (c) is preferably a diol selected from the group consisting of ethylene glycol; propylene glycol, 1,3-propanediol, 2-methyl-1,3-propanediol, 2,4-dimethyl-2-ethyl-hexane-1,3-diol, 2,2-dimethyl-1,3-propanediol(neopentylglycol),2-ethyl-2-butyl-1,3-propanediol(neopentylglycol),2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol,diethylene glycol, triethylene glycol, tetraethylene glycol, pentaethylene glycol, hexaethylene glycol, heptaethylene glycol, octaethylene glycol, nonaethylene glycol, decaethylene glycols, 2,2,4-trimethyl-1,3-pentanediol, hydroxypivalyl hydroxypivalate, dipropylene glycol, 1,10-decanediol, hydrogenated bisphenol A, and mixtures thereof. The difunctional reactant of (c) is more preferably selected from the group consisting of diethylene glycol; neopentyl glycol, cyclohexanedimethanol, 2-ethyl-2-butyl-1,3-propanediol, 2,2,4-trimethyl-1,3-pentanediol, hydroxypivalyl hydroxypivalate, and 2-methyl-1,3-propanediol, with diethylene glycol, neopentyl glycol, and cyclohexanedimethanol being most preferred.

Advantageous difunctional components which are aminoalcohols include aromatic, aliphatic, heterocyclic and other types as in regard to component (d). Specific examples include 5-aminomethyl-cyclohexanemethanol; 5-amino-2-ethylpentanol-1,2-(4-p-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —C(R)$_2$—OH group.

Advantageous difunctional monomer components which are aminocarboxylic acids include aromatic, aliphatic, heterocylic, and other types as in regard to component (d) and include lactams. Specific examples include 6-aminocaproic acid, its lactam known as caprolactam, omega-aminoundecanoic acid, 3-amino-2-dimethylpropionic acid, 4-(β-aminoethyl)-benzoic acid, 2-(β-aminopropoxy) benzoic acid, 4-aminomethlcyclohexanecarboxylic acid, 2-(β-aminopropoxy) cyclohexanecarboxylic acid, etc. Generally these compounds contain from 2 to 20 carbon atoms.

Advantageous examples of difunctional monomer component (d) which are diamines include ethylene-diamine; hexamethylenediamine; 2,2,4-trimethylhexamethylenediamlne; 4-oxaheptane-1,7-diamine; 4,7-dioxadecane-1,10-diamine; 1,4-cyclohexanebismethylamine; 1,3-cycloheptamethylenediamine; dodecamethylenediamine, etc.

Reactant (e), when used, preferably contains 3 to 6 hydroxyl and/or carboxyl groups; more preferred is trimethylolpropane (TMP), trimethylolethane (TME), glycerine, pentaerythritol, arytritol, threitol, dipentaerythritol, sorbitol, trimellitic anhydride, pyromellitic dianhydride, or dimethylolpropionic acid, with TMP being most preferred. It is preferred that reactant (e) be present in a minor amount up to 40 mole percent, more preferred 0 to 20 mole percent.

The copolyester composition used as a component of the hot melt adhesives of the present invention preferably comprises 60 to 100 mole percent of (a), 4 to 20 mole percent of (b), 80 to 100 mole percent of (c), 0 to 10 mole percent of (d), and 0 to 20 mole percent of (e).

The use of sulfonated copolyester confers the additional advantage of providing a degree of water sensitivity which is dependent on the ionic strength of the aqueous environment. Thus, adhesives can be formulated which are sufficiently resistant to the ionic environments encountered during use (such as the exposure to bodily fluids encountered in diapers and feminine napkins) yet still disperse and/or debond in tap water, which is of lower ionic strength. These adhesives are therefore particularly useful in constructing flushable disposable articles.

The sulfonated copolyester component has been found to provide the unique properties to the adhesives of the present invention. The ability to use such levels of this material in adhesives is unexpected in light of the fact that the polymer, by itself, does not possess an adequate balance of heat and cold adhesion as required by specific end use applications. Moreover, the adhesive can be applied at relatively low temperatures, i.e. as low as about 220° F., a definite advantage in many applications involving heat sensitive substrates which may be damaged by coating with molten adhesives at higher temperatures, while providing a greater degree of safety to the handler.

The preparation of the copolyesters used herein is generally described, for example, in U.S. Pat. Nos. 4,910,292, 4,973,656, and 4,990,593. Recently, improved sulfonated polyesters were developed (Miller et al WO 95/18191) which are characterized by reduced Tg's of less than 20° C. and by the incorporation of branch points to raise the strength/viscosity ratio. The preferred polycondensation reactant conditions for the preparation of the polyester are at a temperature of 150° C. to 230° C. in the presence of a catalyst. The catalyst for the polycondensation reaction is preferably an acid catalyst more preferably an organometallic compound, such as a tin or titanium containing compound. Suitable examples of the acid catalyst include dibutyltinoxide, stannous oxalate, titaniumtetraisopropoxide, butylstannoic acid, and p-toluenesulfonic acid, with butylstannoic acid being most preferred. A preferred butylstannoic acid catalytic amount is 0 to 0.5 weight percent, based on the total weight of reactants, preferably 0.01 to 0.2 weight percent, with 0.1 weight percent being most preferred.

The viscosity of the copolyester is preferably between 1000 cP and 1,000,000 cP at 350° F., most preferably between 5000 and 500,000 cP. Viscosity is measured in a Brookfield viscometer using a #27 spindle. Viscosity is generally related to molecular weight with higher viscosities corresponding to higher molecular weights.

Examples of the copolyesters of the type herein described above include Eastman AQ 1350, a low viscosity product with a Brookfield viscosity ranging from 28,000–45,000 cP at 177° C. and a glass transition temperature (Tg) of approximately −2° C., and Eastman AQ 1950, a medium viscosity product with a Brookfield viscosity ranging from 80,000–110,000 cP and a Tg of 3° C., and Eastman AQ14000, a high viscosity product with a Brookfield viscosity ranging from 300,000–500,000 cP and a Tg of 7° C. All of these copolyesters are commercially available from Eastman Chemical Company, Kingsport, Tenn.

The tackifying resins which are used in the adhesives of the present invention are those which extend the adhesive properties and improve the specific adhesion of the polymer. These resins are generally polar in nature and have a Ring and Ball softening point greater than 60° C., although small amounts of non-polar tackifiers may also be used in combination with polar tackifiers as will hereinafter be described. The present formulation includes about 0% to about 80%, by weight, of a tackifying resin, whether polar or a combination of polar and non-polar tackifiers. As used herein, the team "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin and phenolic modified pentaerythritol ester of rosin;

(c) polyterpene resins having a softening point, as determined by ASTM method E28–58T, of from about 20° C. to about 140° C., the latter polyterpene resins generally resulting from the polymerization of terpene hydrocarbons, such as the monoterpene known as pinene, in the present of Friedel-Crafts catalysts at moderately low temperatures; also included are the hydrogenated polyterpene resins;

(d) copolymers and terpolymers of natural terpenes, e.g. styrene/terpene, alpha-methyl styrene/terpene and vinyl toluene/terpene;

(e) phenolic-modified terpene resins such as, for example, the resin product resulting from the condensation, in an acidic medium, of a terpene and a phenol;

Mixtures of two or more of the above described tackifying resins may be required for some formulations. Although a range of 0%–80%, by weight, of tackifying resins may be used, the preferred range is 15% to 50%. An example of a commercially available tackifying resin which is useful for the present invention includes the resin which is identified commercially by the trade designation Sylvares TP-2040. This resin is a terpene-phenolic resin available from Arizona Chemical Company.

Commercially available polymerized rosins may be secured from Arizona Chemical Company under the trade designations "Sylvaros PR-295, PR-85, PR-95 and PR-140" respectively. Additionally, Hercules, Inc. produces a suitable dimerized rosin under the trade designation "Demerex". Commercially suitable partially hydrogenated rosins may also be secured from Hercules, Inc. under the trade designations "Foral NC,""Foral AX" and "Stabelite". Finally, partial esters of dibasic modified tall oil rosins may be secured from Arizona Chemical Company under the trade designations "Sylvatac 203" and "Beckacite 4901".

In the formulations, typically terpene phenolic tackifiers such as Sylvares TP-2040 are generally not water dispersible. However, because the sulfonated copolyester is very water sensitive, incorporating the tackifier at low levels (i.e., less than 50%) into the present adhesive formulations does not inhibit the water sensitivity of the adhesive.

Additionally, small amounts (i.e. less than 20 percent by weight) of non-polar tackifiers may be used in combination with the previously described polar tackifiers. Typical of this class of non-polar tackifiers are:

(f) aliphatic petroleum hydrocarbon resins having Ring and Ball softening points of from about 10° C. to about 140° C., the latter resins resulting from the polymerization of monomers consisting primarily of olefins and diolefins; also included are the hydrogenated aliphatic petroleum hydrocarbon resins; examples of such commercially available resins based on a $C_5$-olefin fraction of this type are "Wingtack 95" and "Wingtack 115" tackifying resins sold by Goodyear Tire and Rubber Company;

(g) aromatic petroleum hydrocarbons and the hydrogenated derivatives thereof;

(h) aliphatic/aromatic petroleum derived hydrocarbons and the hydrogenated derivatives thereof;

(i) hydrogenated cyclic aliphatics such as Escorez 5400 from Exxon Chemical Company.

Both water-soluble and water-insoluble plasticizers can be present in the composition of the present invention in amounts of about 0% to about 40% by weight, preferably from about 5% to 30% by weight, and most preferably from about 10% to 20% by weight, in order to provide desired viscosity control and water solubility without substantially decreasing the adhesive strength or the service temperature of the adhesive. Both liquid and solid plasticizers can be used in the composition of the present invention.

The water-soluble plasticizers used herein comprise low molecular weight (molecular weight of 1000 or less) polyethylene glycols, multifunctional alcohol and the general class of surfactants wherein the molecules contain both a hydrophilic group and a hydrophobic group. The hydrophilic group of the molecule generally consists of, but is not limited to, polyethylene glycol, polypropylene glycol, copolymers of ethylene and propylene glycols, a mono- or di-hydroxylated amine group, an ethoxylated amino radical, polyalkylene glycol esters of carboxylic group, substituted or unsubstituted glycerol, glucose, sucrose and sorbitan groups. The hydrophobic group of the molecule generally consist of, but is not limited to, a hydrocarbon radical such as, alkylphenol groups, dialkyl phenol groups, or a linear or branched aliphatic radicals. The preferred soluble plasticizers include ethoxylated fatty acids and ethoxylated fatty alcohol having a HLB value in the range of 8.0–20.0. An ethoxylated tridecyl alcohol with HLB value of 14 can be obtained under the trade designation Iconol TIDA-10 from BASF Corporation and water-soluble ethoxylated fatty acids, such as polyethylene glycol 600 monolaurate (HLB=14.6) and polyethylene glycol 1000 dilaurate (HLB=14.2), can be purchased from Stepan Company of Northfield, Ill. under the trade designations of Kessco PEG 600MC and Kessco PEG 1000DL, respectively.

A suitable insoluble plasticizer may be selected from the group which includes dipropylene glycol dibenzoate; pentaerythritol tetrabenzoate; polyethylene glycol 400-di-2-ethylhexoate; 2-ethylhexyl diphenyl phosphate; butyl benzyl phthalate, dibutyl phthalate and dioctyl phthalate. Suitable dipropylene glycol dibenzoate and pentaerythritol tetrabenzoate may be purchased from Velsicol Chemical Company of Chicago, Ill. under the trade designations "Benzoflex 9-88 and S-552", respectively. Further, a suitable polyethylene glycol 400-di-2-ethylhexoate may be purchased from C.P. Hall Company of Chicago, Ill. under the trade designation "Tegmer 809". A suitable 2-ethylhexyl diphenyl phosphate, and a butyl benzyl phthalate may be purchased from Monsanto Industrial Chemical Company of St. Louis, Mo. under the trade designation "Santicizer 141 and 160", respectively.

The aforementioned plasticizers can be each used alone or in any combination of two or more plasticizers in the adhesive composition of the present invention.

The present invention includes a stabilizer or antioxidant in an amount of from 0% to about 3% by weight, but preferably from about 0.1 to 1%. The stabilizers which are useful in the hot melt compositions of the present invention are incorporated to help protect the polymers noted above, and thereby the total adhesive system, from the effects of thermal and oxidative degradation which normally occurs during the manufacturing and application of the adhesives as well as in the ordinary exposure of the final product to the ambient environment. Such degradation is usually manifested by a deterioration in the appearance, physical properties and performance characteristics of the adhesive. Among the applicable stabilizers or antioxidants are phosphites, thioesters, substituted amines, mercaptobenzimidazole derivatives, hydroquinone derivatives, hindered phenols and multifunctional phenols, such as sulfur and phosphorus-containing phenols. Particularly usefill stabilizers or antioxidants are hindered phenols. Hindered phenols are well known to those skilled in the art and may be characterized as phenolic compounds which also contain sterically bulky radicals in close proximity to the phenolic hydroxyl group thereof. Representative hindered phenols include:

1,3,5-trimethyl-2,4,6-tris(3,5-di-tert-butyl-4-hydroxybenzyl) benzene;

n-octadecyl-3-(3,5-di-tert-butyl-4-hydroxyphenyl) propionate;

4,4'-methylenebis(4-methyl-6-tert-butylphenol);

4,4'-thiobis(6-tert-butyl-o-resol);

2,6-di-tert-butylphenol;

6-(4-hydroxyphenoxy)-2,4-bis(n-octylthio)-1,3,5-triazine;

2,4,6-tris(4-hydroxy-3,5-di-tert-butylphenoxy)-1,3,5-triazine;

di-n-octadecyl-3,5-di-tert-butylbenylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

An especially preferred antioxidant is Irganox 1010, a tetrakis(methylene(3,5-di-tert-butyl-4-hydroxyhydrocinnamate))methane manufactured by Ciba Geigy.

The performance of these stabilizers may be further enhanced by utilizing, in conjunction therewith; (1) synergists such as, for example, thiodipropionate esters and phosphites; and (2) chelating agents and metal deactivators such as, for example, ethylenediaminetetraacetic acid, salts thereof, and disalicylalpropylenediimine.

The hot melt adhesive composition of the present invention also includes as a separate essential ingredient from about 5% to about 50% by weight of polyethylene glycol (PEG) having a molecular weight greater than 2000 and a melting point greater than 50° C. The preferred amount of high molecular weight PEG is 5% to 30%, and the most preferred amount is 10% to 25% by weight.

The term polyethylene glycol used herein refers to a family of water-soluble polymers formed by the addition reaction of ethylene oxide. The generalized formula for polyethylene glycol can be expressed as the following:

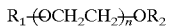

Where n is the average number of repeating oxyethylene units. $R_1$ and $R_2$ can be each independently chosen from the group of radicals including —H, alkyl groups having 1 to 20 carbon atoms, amine or substituted amines. The most preferred PEGs are those where $R_1$ is a hydrogen(—H) and $R_2$ is either a hydrogen (—H) or a methyl (—$CH_3$) or ethyl(—$C_2H_5$) moiety.

The definition of relatively high molecular-weight polyethylene glycol also includes copolymers of glycols having an average molecular weight greater than 2000 and a melting point greater than 50° C. An example of such copolymer glycols includes a block copolymer of ethylene glycol and propylene glycol, trade designation Pluronic F68 (BASF Corporation, Mount Olive, N.J.), with an overall average molecular weight of about 8400 g/mol and a melting point of 52° C.

The relatively high molecular weight polyethylene glycol used in this adhesive composition substantially eliminates any cold flow. Cold flow is a highly undesirable property for certain construction adhesive applications. Also, the use of higher molecular weight water soluble polyethylene glycol is not as detrimental to the solubility of the adhesive in water as compared to the crystalline materials used in the adhesive taught in the U.S. Pat. No. 5,750,605, i.e. the present adhesive using high molecular weight PEG has increased solubility in water as compared to the same formulation utilizing the crystalline material taught in the '605 patent. In addition, it has been found that high molecular weight polyethylene glycol is more compatible with the other components of the adhesive blend than the crystalline materials taught in the '605 patent.

A suitable high molecular weight PEG may be purchased from Union Carbide under the trade designation Carbowax. Other suitable PEGs include homopolyethylene glycol under the trade designation Polyglycol from Dow Chemical Company, Midland, Mich. and block copolymers of ethylene glycol and propylene glycol under the trade designation Pluronic and Tertronic from BASF Corporation. The relatively high molecular weight solid PEG component also includes derivatives of PEG so long as the derivatives also have an average molecular weight greater than 2000 g/mol and a melting point greater than 50° C.

Fillers and other optional additives may be incorporated into the adhesive composition in order to modify particular physical properties. These additives may include colorants, such as titanium dioxide and fillers such as talc, calcium carbonate and clay, which if incorporated into the adhesive composition and can be present in amounts ranging from 0.1% to about 50% by weight.

The adhesive composition useful in the method of the present invention may be formulated using any of the techniques known in the art. A representative example of the prior art procedure involves placing all the components, except the sulfonated copolyester polymer, in a jacketed mixing kettle equipped with a rotor. The contents of the kettle are then heated to a temperature between 200 to 400° F. at which they become a flowable liquid. The polymer is subsequently introduced to the kettle under agitation and the mixing is allowed to continue until a smooth and uniform mixture is formed.

The adhesive composition of the present invention may be used in a variety of applications. The nonpressure sensitive adhesives may be utilized in manufacturing corrugated boxes, in carton sealing and bookbinding applications.

They may also be used in manufacturing of toilet tissues, paper towels, wipes and other consumer products as the laminating adhesive to bind a plurality of substrate layers.

The water-sensitive hot melt adhesives of the present invention are especially useful in assembly or construction of disposable nonwoven articles to bind a substrate composed of nonwoven fabric, tissue, absorbent fluff, superabsorbent materials, elastic bands or the like to another substrate. This second substrate may be another nonwoven fabric, tissue, fluff, superabsorbent material, or plastic materials such as, for example, polyethylene or polypropylene film.

The water-sensitive hot melt adhesives of the present invention can be coated or applied with a variety of application techniques known in the art, which include, for example, slot die, spiral spray, melt blown, extrusion, application wheel, or other known application apparatus.

The invention is further illustrated by way of the examples which are set forth below:

EXAMPLE 1

A water-sensitive hot melt adhesive was prepared by charging into a mixing vessel equipped with a heater and an agitator, 50 g high molecular weight polyethylene glycol (Carbowax Compound 20M, Union Carbide), 72.5 g hydrogenate rosin tackifying resin (Foral AX, Hercules) and 2.5 g hindered phenol antioxidant (Irganox 1010, Ciba Additives). The contents of the vessel was heated to 300° F. to melt the tackifying resin. Next, 125 grams of sulfonated copolyester polymer (AQ 1350, Eastman) was slowly added under agitation. The mixture was stirred at a constant temperature of 300° F. until a smooth and uniform mixture was formed. The adhesive is almost odorless and has light amber color. It has a viscosity of 3240 cP at 300° F. and a Ring and Ball softening point of 160° F. The adhesive is useful in the assembly of disposable nonwoven articles.

Onto a 1 mil thick polyethylene film, the adhesive was applied in the amount of 14 $g/m^2$ by spiral spray method from a hot melt coater (Model LH1, Acumeter Laboratories) at 300° F. The coated polyethylene film was immediately laminated on line to a polypropylene nonwoven substrate to form an assembly typically found in disposable nonwoven articles such as in diapers and sanitary napkins. The 180° peel strength of the laminate, as measured by Instron Tester at 12"/min crosshead speed, is about 220 g/cm coated width. The water sensitivity of the adhesive is demonstrated by dipping the specimen into water at the ambient temperature. After two minutes of soaking, the adhesive losses its bond strength and the specimen will delaminate.

EXAMPLES 2–6

These examples demonstrate the cold flow resistant property of the present water sensitive hot melt adhesives containing solid PEG. The hot melt adhesives of Examples 2–6, containing the components in the amount shown in Table 1, were prepared by using the same procedure as herein described above in Example 1.

The component Eastman AQ 1950 used is a branched copolyester polymer herein mentioned above. Iconol TDA-10 is an ethoxylated alcohol plasticizer purchased from BASF corporation, Mount Olive, N.J. Foral AX is a hydrogenated rosin tackifier obtained from Hercules Corporation. Carbowax 400 is a low molecular weight liquid PEG with an average molecular weight of about 400 g/mol, and Carbowax 2000, 5000, 8000 and Compound 20M are relatively high molecular weight PEGs with average molecular weight of 2000, 5000, 8000 and 20,000 g/mol, respectively. Carbowax PEGs are commercially available from Union Carbide Corporation. The adhesives of Examples 2–6 have the same amount of each components and they differ only in the molecular weight of the PEG component used in the composition.

TABLE 1

| Component[1] | Example | | | | |
|---|---|---|---|---|---|
| | 2 | 3 | 4 | 5 | 6 |
| AQ 1950 | 35.0 | 35.0 | 35.0 | 35.0 | 35.0 |
| Iconol TDA-10 | 5.0 | 5.0 | 5.0 | 5.0 | 5.0 |
| Foral AX | 44.0 | 44.0 | 44.0 | 44.0 | 44.0 |
| Carbowax 400 | 15.0 | — | — | — | — |
| Carbowax 2000 | — | 15.0 | — | — | — |
| Carbowax 5000 | — | — | 15.0 | — | — |
| Carbowax 8000 | — | — | — | 15.0 | — |
| Carbowax Compound 20M | — | — | — | — | 15.0 |
| Antioxidant | 1.0 | 1.0 | 1.0 | 1.0 | 1.0 |
| R & B Softening Point (° F.)[2] | 80 | 137 | 145 | 145 | 148 |
| Viscosity at 250° F. (cP)[3] | 385 | 1030 | 1140 | 1570 | 4500 |
| Initial Height (mm) | 12 | 12 | 12 | 13 | 12 |
| Final Height (mm) | 4 | 12 | 12 | 13 | 12 |
| Change in Height (mm) | 8 | 0 | 0 | 0 | 0 |
| Cold-Flow | yes | no | no | no | no |

[1]The component amounts are given in weight percentage
[2]Tested according to ASTM E-28 method
[3]Tested according to ASTM D-3236 method The adhesives in Examples 2–6 are all dispersible in tap water and are useful for various end uses.

Testing was done to compare the cold-flow resistant properties of Examples 2–6. In this test, a slab was cast from the melt for each adhesive sample in a silicone rubber mold of approximately 12 mm×13 mm×68 mm in dimension. The slabs were then conditioned at the ambient temperature for 48 hours. Subsequently, the slabs were placed on a sheet of silicon-coated paperboard and put in an oven at 37.8° C. (100° F.), which is the temperature the adhesive will encounter during storage and transportation. The change in the shape of the slabs, as reflected by reduction in height is an indicator of cold-flow. After 24 hours, the slab samples were removed from the oven and the height of each slab was measured. The initial and the final heights of each sample, rounded to the nearest millimeters, are also given in Table 1. The advantage of solid PEG used herein in the present invention is obvious. Examples 3–6, each of which contains a solid PEG of relatively high molecular weight, do not show any change in dimension, whereas Example 2, which contains a liquid PEG of relatively low molecular weight, exhibits excessive reduction in the height of the slab, indicating a sever cold-flow behavior.

EXAMPLES 7–11

These examples demonstrate the formulation of hot melt adhesives for various end uses. The water-sensitive hot melt adhesives in Examples 7–11, containing various components in the amount shown in Table 2, were prepared by using the same procedure as in Example 1.

TABLE 2

| Component[1] | Example | | | | |
|---|---|---|---|---|---|
| | 7 | 8 | 9 | 10 | 11 |
| AQ 14000 | 32.0 | 25.0 | — | — | — |
| AQ 1950 | — | — | 30.0 | 22.7 | — |
| AQ 1350 | — | — | — | — | 40.0 |

TABLE 2-continued

| Component[1] | Example | | | | |
|---|---|---|---|---|---|
| | 7 | 8 | 9 | 10 | 11 |
| Carbowax Compound 20M | 20.0 | 20.0 | 30.0 | 36.3 | 20.0 |
| Iconol TDA-10 | 10.0 | — | — | 9.1 | — |
| Pluronic L43 | — | 10.0 | 15.0 | — | — |
| Foral AX | 37.0 | — | — | — | 39.0 |
| Sylvaros PR295 | — | 34.0 | — | 30.9 | — |
| Sylvares TP 2040 | — | — | 24.0 | — | — |
| Antioxidant | 1.0 | 1.0 | 1.0 | 1.0 | 1.0 |
| R & B softening point | 142 | 141 | 145 | 140 | 147 |
| Viscosity at 250° F., cP | 2320 | 1680 | 4880 | 2570 | 5850 |
| Cold flow | no | no | no | no | no |

[1]The amounts shown are given in weight percentage.

In Table 2, Pluronic L43 is a liquid ethylene glycol-propylene glycol block copolymer plasticizer obtained from BASF Corporation, and Sylvares TP2040 and Sylvaros PR295 are terpene-phenolic and modified rosin tackifiers, respectively. Sylvares TP2040 and Sylvaros PR295 can be purchased from Arizona Chemical Company. All the adhesives in Examples 7–11 are readily soluble in tap water at the ambient temperature and are useful for tissue lamination, flexible packaging, labeling, case and carton sealing, and construction of disposable nonwoven articles.

COMPARATIVE EXAMPLES C1–C3

Two prior art adhesives (Sample 1 and 2 of Example 1, U.S. Pat. No. 5,750,605) were reproduced here for comparative studies and were marked as C1 and C2. Comparative sample C3 was prepared by using the components taught in the '605 patent in the amounts within the most preferred range of the present invention. Table 3 shows the relative amount of various components. The experimental grade copolyester X-24272–126 (Eastman) used in the '605 patent was no longer available and therefore was replaced with the identical commercial grade AQ 1950 herein described above. Sulfonic DNP-100 utilized is a liquid dinonyl phenol ethoxylate plasticizer manufactured by Huntsman Chemical Corporation, Paricin 220 a N-(2-hydroxy ethyl)-12-hydroxystearamide polar wax from CasChem, Sylvares TP300 (formerly Nirez 300) a terpene-phenolic tackifier from Arizona Chemical Company and sucrose benzoate a biodegradable tackifier from Aldrich Chemical, Inc.

TABLE 3

| Component | Comparative Example | | |
|---|---|---|---|
| | C1 | C2 | C3 |
| AQ 1950 | 60.0 | 60.0 | 35.0 |
| Sylvares TP300 | 10.0 | 20.0 | — |
| Surfonic DNP-100 | 10.0 | 20.0 | 5.0 |
| Paricin 220 | 20.0 | 20.0 | 10.0 |
| Sucrose benzoate | — | — | 49.0 |
| Antioxidant | 1.0 | 1.0 | 1.0 |
| R & B Softening point (° F.) | 191 | 201 | 208 |
| Viscosity at 250° F. (cP) | 1000 | 6290 | 11820 |

EXAMPLE 12

This example demonstrates the enhanced dispersibility and improved rate of dispersion of adhesives of the present invention. To test dispersibility and rate of dispersion, approximately 3 grams each of the adhesives of Examples 3 to 11 and comparative Examples C1 to C3 were placed in an 8 oz glass jar. All the samples were cut to 12 mm×12 mm and 20 mm rectangular shape to ensure that they had roughly the same surface area. Approximately 150 ml tap water was next poured into each jar. The jars were then fixed onto a reciprocal shaker (Eberbach Corporation) and shook at about 180 Hz frequency at the ambient temperature. The content of each jar was visually inspected at 1 hr intervals to determine dispersibility. The time took to disperse the sample completely was recorded. The test results are given in Table 4.

It is found that the adhesives of Examples 3–11 of the present invention take 2–7 hours to disperse in tap water, whereas the adhesives of C1 and C3 taught in the '605 patent cannot be dispersed even after 48 hours shaking. C2 takes approximately 12 hours to disperse, Clearly, the adhesives of the present invention have greatly improved dispersibility and increased rate of dispersion.

TABLE 4

| Example | Time to Dispersion (hour) |
| --- | --- |
| C1 | not dispersible |
| C2 | 12 |
| C3 | not dispersible |
| 3 | 3 |
| 4 | 3 |
| 5 | 3 |
| 6 | 3 |
| 7 | 5 |
| 8 | 6 |
| 9 | 7 |
| 10 | 2 |
| 11 | 4 |

EXAMPLE 13

The bonding properties of the adhesives of the present invention on low surface energy substrates was determined by measuring 180° peel strength on test specimens prepared by laminating polyethylene film to polypropylene spanbond nonwovens with the adhesive of Examples 7–11 by using a spiral spray coating method in accordance with the procedures herein described above in Example 1. Specimens for Comparative Examples C1 to C3 were similarly prepared. The coating weight was maintained at 14 g/m² and the coating temperature was varied for each adhesive to obtain the optimum coating pattern. The peel strength was tested with a tensile tester (Instron Model 55R1122) in the controlled atmospheric environment (77° F., 50% HR). The test was carried out at a cross-head speed of 12 inches/min. The average peel value of six specimens, normalized to g/cm unit, is reported as the peel strength in Table 5.

TABLE 5

| Sample | Coating Temp. (° F.) | Peel Strength (g/cm) |
| --- | --- | --- |
| Example 7 | 250 | 144 |
| Example 8 | 250 | 170 |
| Example 9 | 250 | 152 |
| Example 10 | 275 | 166 |
| Example 11 | 275 | 318 (substrate tear) |
| Comparative Example C1 | 235 | 15 |
| Comparative Example C2 | 275 | 36 |
| Comparative Example C3 | 300 | 5 |

It is obvious from Table 5 that the adhesives of Examples 7–11 of the present invention can all form a strong bond with low surface nonpolar substrates such as polyethylene film and polypropylene nonwoven materials, whereas the comparative samples of the prior art show very little bond on the same substrate.

A peel strength of at least 100 g/cm is normally required for application in the construction of nonwoven articles. The adhesives of Examples 7–11 of the present invention have shown peel strength equal to or greater than 144 g/cm, far above the minimum requirement to nonwoven construction. The maximum peel strength obtained with samples of the prior art adhesive is only 36 g/cm, which falls far below the 100 g/cm minimum requirement for the nonwoven construction application.

EXAMPLE 14

This example demonstrates a peelable bottle labeling application for the adhesive composition of the present invention. The water-sensitive hot melt adhesive of Example 11 was applied from melt to a 2"×6" paper strip cut off from a sheet of white photocopy paper at about 1.5 mil thickness with a hot draw-down bar on a hot draw-down plate at about 250° F. The adhesive coated strip was then immediately adhered to a glass jar. A paper tear bond was formed when tested dry. After 15 minutes soaking in tap water at the ambient temperature, the paper label becomes peelable and can be easily removed from the jar.

EXAMPLE 15

The adhesives of Examples 7 and 11 were each coated from the melt on unbleached Kraft linerboard of 76 lb/ream basis weight to a thickness of approximately 1.0 mil. Each coated linerboard was then cut into 1"×1" squares. Approximately 10 grams of cut paper were placed into a Waring blender containing about 490 grams of tap water at near neutral pH. After 120 minutes soaking at the ambient temperature, the contents of the blender were agitated at 3500 rpm for about 30 minutes to obtain a secondary pulp slurry of 2% consistency. Following the repulping, an aliquot of 200 grams of the pulp was removed from the Waring blender and diluted to 0.5% consistency with tap water. The diluted pulp was then poured into a Buchner funnel that contained a screen of 150 micron mesh size. Vacuum was drawn for a short interval until water was drained from the funnel and a handsheet was formed. The handsheet was removed from the funnel and blotted with Whatman #4 filter paper. The handsheet was then dried on a hot plate. The dried handsheet was subsequently examined for adhesive contaminants or "stickies". The handsheet so obtained was found to be free of any adhesive contamination or stickies, indicating that the adhesive coated on the paper had been solubilized or dispersed in water and therefore, could be easily separated from the pulp. This test showed that the adhesives in the example are completely repulpable.

EXAMPLE 16

This example demonstrates the carton sealing application of the adhesives of the present invention.

The adhesive of Example 6 was applied in the form of beads to a corrugated box and the box was immediately sealed. The adhesive solidifies quickly to give a fiber-tear bond when dry. However, the bond lost its strength and allowed the seal to open after 2 minutes soaking in tap water at the ambient temperature.

EXAMPLE 17

This example demonstrates the thermal stability of the adhesive compositions of the present invention. Fifty grams of the adhesive samples of Examples 3–11 were each separately transferred to a glass jar and placed in an air-circulating oven at 250° F. for a 48 hour period. The adhesives were each examined for signs of thermal degradation such as skinning, gelling, darkening and ring formation and the results are listed in Table 6.

TABLE 6

|  | Skinning | Gelling | Darkening | Ring Formation |
| --- | --- | --- | --- | --- |
| Example 3 | none | none | none | none |
| Example 4 | none | none | none | none |
| Example 5 | none | none | none | none |
| Example 6 | none | none | none | none |
| Example 7 | none | none | none | none |
| Example 8 | none | none | slight | none |
| Example 9 | none | none | slight | none |
| Example 10 | none | none | none | none |
| Example 11 | none | none | none | none |

All the adhesives showed no sign of severe thermal degradation.

I claim:

1. A heat stable water-sensitive hot melt adhesive composition, comprising:
   (a) about 10% to about 90%, by weight, of a branched sulfonated copolyester polymer or blend of branched sulfonated copolyester polymers, said branched sulfonated copolyester polymer comprising a reaction product of a multifunctional reactant containing at least three functional groups selected from hydroxyl, carboxyl, and mixtures thereof wherein at least a portion of the multifunctional reactant contains at least three hydroxyl groups;
   (b) about 5% to about 50% by weight of a polyethylene glycol having a molecular weight greater than 2000 and a melt point greater than 50° C.;
   (c) about 0% to about 80%, by weight, of a compatible tackifying resin; and
   (d) about 0% to about 40%, by weight, of a plasticizer;
   (e) about 0% to about 3% by weight of a stabilizer; and
   (f) the components of the composition adding up to 100% by weight, and wherein the adhesive composition maintains the integrity of a disposable article during normal use but degrades in the presence of water thereby permitting the disposable article to be easily disassembled and subsequently recycled.

2. The composition of claim 1 wherein the polyethylene glycol is a homopolymer of ethylene oxide having the following generalized molecular formula:

$$R_1\text{-}(OCH_2CH_2)_n\text{-}OR_2$$

where $R_1$ and $R_2$ are each independently selected from the group of radicals consisting of a hydrogen atom (—H), an alkyl group having 1 to 20 carbon atom chain length, an amine and a substituted amine.

3. The composition of claim 2 wherein $R_1$ and $R_2$ are hydrogen atoms.

4. The composition of claim 2 wherein $R_1$ is a hydrogen atom and $R_2$ is selected from the group consisting of a methyl (—CH$_3$) or ethyl (CH$_3$CH$_2$—) moiety.

5. The composition of claim 1 wherein the polyethylene glycol comprises copolymers of ethylene glycol and propylene glycol having an overall molecular weight greater than 2000 g/mol and a melting point greater than 50° C.

6. The composition of claim 5 wherein the said copolymer glycols are diblock, triblock or multiblock copolymers.

7. The composition of claim 1 wherein the compatible tackifying resin is selected from the group consisting of polymerized rosin, hydrogenated and partially hydrogenated rosin, terpene-phenolics, rosin acids, rosin esters, polyterpene resins, as well as styrene, α-methylstyrene and vinyl toluene modified terpene resins, and synthetic hydrocarbon resins.

8. The composition of claim 1 wherein the plasticizer is water-soluble and is selected from the group consisting of polyethylene glycol ranging from 200–2000 in molecular weight, liquid random or block copolymers of ethylene and propylene glycols, glycerol and a surfactant having both a hydrophilic moiety and a hydrophobic moiety.

9. The composition of claim 8 wherein the hydrophilic moiety of said surfactant is selected from the group consisting of polyethylene glycol, polypropylene glycol, mono- or di-hydroxylated amine group, ethoxylated amino radical, polyalkylene glycol esters of carboxylic group, substituted or unsubstituted glycerol, glucose, sucrose and sorbitan groups.

10. The composition of claim 8 wherein the hydrophobic moiety of said surfactant is selected from the group consisting of alkyphenol groups, dialkyl phenol groups, and a linear or branched aliphatic radical.

11. The composition of claim 8 wherein the plasticizer is selected from the group consisting of polyoxyethylene aryl ethers, ethoxylated fatty acids and ethoxylated fatty alcohol's having a HLB value in the range of 8.0–20.0.

12. The composition of claim 8, wherein the water-soluble plasticizer comprises both liquid and solid plasticizers.

13. The composition of claim 12 wherein the water-soluble plasticizer is selected from the group consisting of polyethylene glycol esters of fatty acids, polyethylene glycol ether of fatty alcohol, ethoxylated alkyphenols and partial glycerol esters.

14. The composition of claim 1 wherein the plasticizer is water-insoluble and is selected from the group consisting of diethylene glycol dibenzoate, dipropylene glycol dibenzoate; pentaerythritol tetrabenzoate; polyethylene glycol 400-di-2-ethylhexoate; triethylene glycol dibenzoate, bis(2-ethylhexyl) adipate, 2-ethylhexyl diphenyl phosphate; butyl benzyl phthalate, dibutyl phthalate and dioctylphthalate.

15. The composition of claim 1 wherein the adhesive composition includes about 0.1% to about 3%, by weight, of an antioxidant.

16. The composition of claim 1 wherein the adhesive composition further includes 0.1% to 50%, by weight, of a filler.

17. The composition of claim 16 wherein said filler comprises talc, calcium carbonate, clay, silica, mica, wollastonite, feldspar, aluminum silicate, alumina, hydrated alumina, glass microspheres, ceramic microspheres, thermoplastic microspheres, baryte and wood flour.

18. The composition of claim 1 wherein the adhesive composition further includes a colorant.

19. A repulpable and water responsive pressure sensitive adhesive sheet comprising a cellulose material and the adhesive composition of claim 1.

* * * * *